United States Patent

[11] 3,591,785

| [72] | Inventor | Kenneth M. Miller |
| | | Oak Park, Ill. |
| [21] | Appl. No. | 777,062 |
| [22] | Filed | Nov. 19, 1968 |
| [45] | Patented | July 6, 1971 |
| [73] | Assignee | Western Electric Company, Incorporated |
| | | New York, N.Y. |

[54] SIGNAL AVERAGING SYSTEM
9 Claims, 1 Drawing Fig.

[52] U.S. Cl. ................................................. 235/154,
328/158, 340/347 AD, 340/347 DA
[51] Int. Cl. ................................................. H03k 13/175,
H03k 13/04
[50] Field of Search ............................................. 340/347;
235/154, 183, 197, 92, 193.5, 196; 324/99, 103,
140 R; 328/116, 117, 142, 143, 158, 159;
367/235; 179/84.7; 307/204, 219, 229; 250/83.3
R, 83.6 R

[56] References Cited
UNITED STATES PATENTS

| 2,541,039 | 2/1951 | Cole | 235/92 UX |
| 2,590,057 | 3/1952 | Wiegand | 235/92 UX |
| 2,842,740 | 7/1958 | Sparks | 235/193.5 UX |
| 3,063,635 | 11/1962 | Gordon | 235/151.31 X |
| 3,129,420 | 4/1964 | Marez | 340/347 |

*Primary Examiner*—Maynard R. Wilbur
*Assistant Examiner*—Michael K. Wolensky
*Attorneys*—H. J. Winegar, R. P. Miller and A. C. Schwarz, Jr.

ABSTRACT: A system for determining a representative value for the average or mean magnitude of a plurality of input signals of diverse magnitudes. The number of input signals received within each of a plurality of magnitude ranges are initially counted within a predetermined period of time, and an analog signal representative of each total count produced. Each analog signal is then normalized with respect to a different predetermined value of magnitude chosen to represent the magnitude of each input signal received within each magnitude range. All of the adjusted analog signals are thereafter combined, with the resulting signal divided by the total number of input signals initially received by the system so as to provide a representative, weighted value for the average magnitude of all of the input signals.

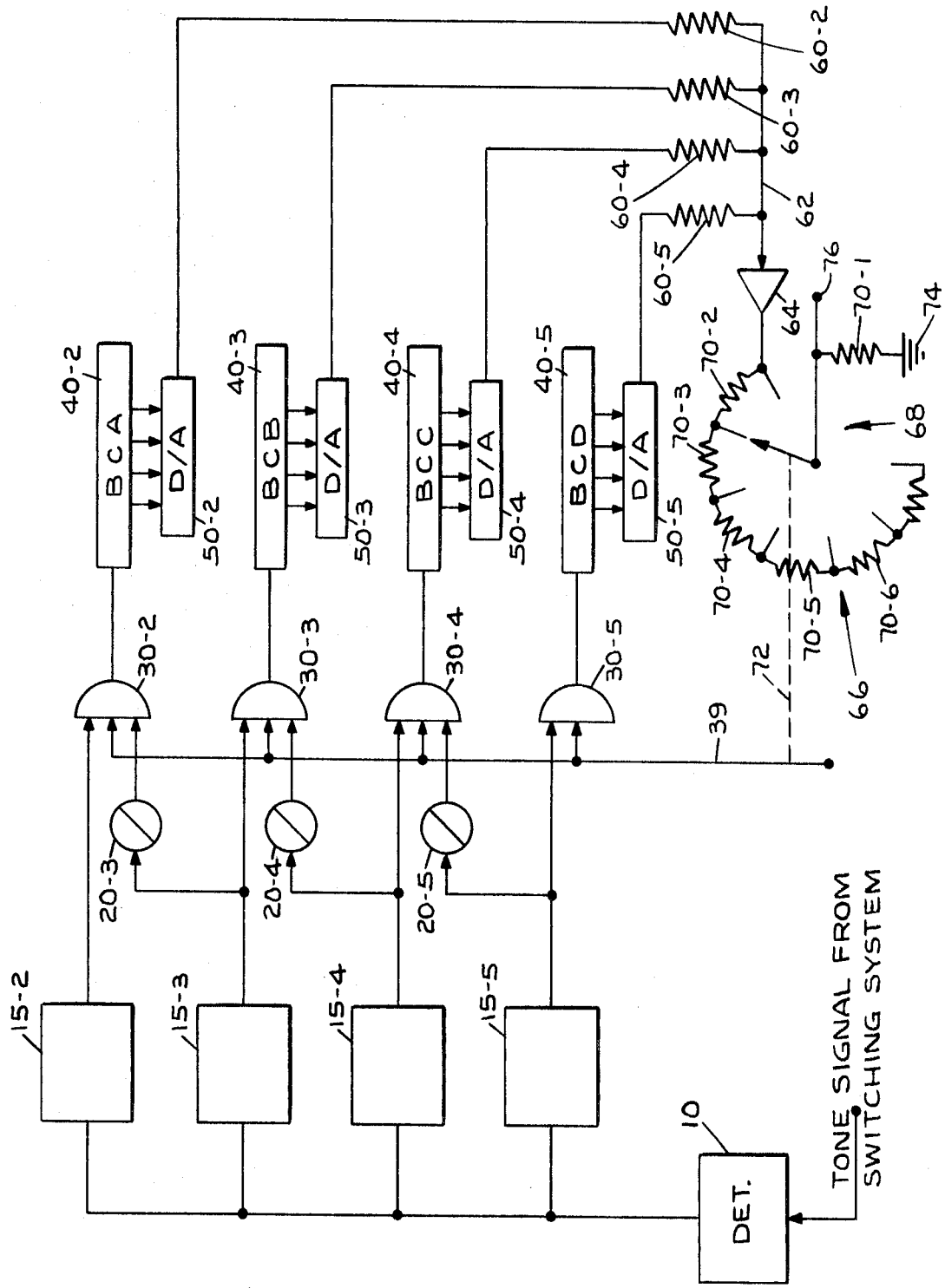

SIGNAL AVERAGING SYSTEM

BACKGROUND OF THE INVENTION

1. Field of the Invention

This invention relates to signal averaging systems and, more particularly, to systems which develop an output signal that is a representative of the mean or average magnitude of a plurality of input signals of diverse magnitudes.

2. Description of the Prior Art

In the testing of electronic telephone switching systems, it is desirable to determine the average loss of signal strength through a plurality of switch connections of the switching system. To accomplish this, a through connection is established in the electronic switching system and an AC tone of a predetermined voltage magnitude is delivered to the input of the switching system. At the output of the switching system, a representation of the voltage level of the partially attenuated signal received must be stored for future reference, since a plurality of different connections and similar test are sequentially made through the switching system. After a sufficient number of test signals have been passed through the switching system and registered, an average value for all of the output signals is determined, and this average, indicative of the degree of signal attenuation exhibited by the switching system, is deemed to be either acceptable or unacceptable.

One prior system for accomplishing this signal averaging function comprises a "relay tree" and a plurality of capacitors. Each attenuated signal that passes through the switching system is converted to a DC voltage level in a detector and is delivered to the input of a relay tree which, through a combination of relay contact connections, delivers this voltage level to the first of a plurality of capacitors. The capacitor is charged to the level of the rectified voltage of the signal received from the switching system. A new connection is then made through the switching system, and the relay tree is actuated to connect the output of the switching system to the second capacitor of the plurality of capacitors. After all of the capacitors have thus been charged, they are disconnected from the relay tree and connected in parallel to enable current to flow from those capacitors that have been charged to a higher voltage than other capacitors to those others. This results in the plurality of capacitors seeking an average value of voltage. The resultant voltage of the parallel-connected capacitors is thus representative of the average or mean value of the several signals received through the several connections of the electronic switching system.

Because of capacitor leakage, contact failures, and other difficulties often encountered with relay tree and capacitor averaging circuits, such circuits unfortunately sometimes prove less than satisfactory for certain demanding applications.

SUMMARY OF THE INVENTION

It is an object of the present invention to obtain accurately and efficiently an average magnitude of a plurality of input signals of diverse magnitudes.

In accordance with the present invention, an average magnitude of a plurality of input signals of diverse magnitudes is determined by producing a counting signal in response to the receipt of a signal in each of a plurality of predetermined magnitude ranges, counting the number of counting signals received in response to the signals received within each predetermined magnitude range, weighting the counts relative to the predetermined magnitude ranges with which they are respectively associated, combining the weighted counts to produce an output signal which is representative of the sum of the weighted counts of all of the signals, and then dividing the output signal by the number of input signals received so as to obtain a weighted average for all of the counts.

BRIEF DESCRIPTION OF THE DRAWING

The present invention will be more readily understood by referring to the following detailed description when considered in conjunction with the accompanying drawing which shows in schematic block diagram form a preferred embodiment of the present invention.

DETAILED DESCRIPTION

Referring now to the accompanying drawing, a tone signal is received from an electronic switching system (not shown) and is of a magnitude determined by the signal attenuation resulting from the signal being directed through a particular path of the switching system. This tone signal is rectified in a detector 10, the output of which is a DC voltage having a magnitude proportional to the amplitude or magnitude of the received tone signal. The DC voltage output from the detector 10 is delivered to the inputs of a plurality of threshold-voltage-responsive electronic switches 15-1 to 15-5, each switch 15 delivering an output interrogated signal upon receipt of an input signal of at least a predetermined voltage magnitude. The well-known Schmitt trigger is one example of a suitable threshold-voltage-responsive electronic switch.

The electronic switches 15 are all adjusted and arranged to be responsive to different levels of input voltage. For example, the electronic switch 15-2 may be adjusted to deliver an interrogated output signal only if the signal received by it exceeds 2 volts DC. Similarly, the electronic switch 15-5 may be adjusted to deliver an interrogated output signal only if it receives a signal having a voltage magnitude of at least 5 volts DC.

The outputs of the electronic switches 15-3, 15-4 and 15-5 are each connected to an individually-associated inverter 20 which inverts any signal received from its associated electronic switch 15. As will become more apparent hereinbelow, the inverters function as selective gate inhibiting devices, and may be of any conventional type.

The output of each of the electronic switches 15 is also delivered to one of the inputs of the particular AND gate 30-2 to 30-4 associated therewith, these gates being of conventional design. Similarly, the output of each of the inverters 20 is delivered to another one of the inputs of one particular AND gate 30, but in this case the particular AND gate is the one associated with the electronic switch 15 which is responsive to a signal falling within the next lower range of signal magnitude. Therefore, it can be seen that the AND gate 30-2, for example, receives one input from its associated electronic switch 15-2 and another input from the inverter 20-3 that is associated with the electronic switch 15-3. Since the AND gate 30-5 is associated with the highest expected range of signal magnitude, it need not receive signals from an inverter 20 as will become more apparent hereinafter.

In addition to the gate inputs mentioned above, each of the AND gates 30 has an input connected to a trigger conductor 39 which periodically delivers an enabling signal to the AND gates 30. More specifically, when a tone signal is received from the switching system and is rectified by the detector 10, a trigger signal is sent from the switching system (not shown) on the trigger conductor 39 to each of the AND gates 30, thereby allowing the otherwise conditioned one of the AND gates 30 to release a counting signal at its output.

Considering the operation of the signal averaging system as thus far described in greater detail, the magnitude of the input signal detected and rectified by the detector 10 determines which one of the AND gates 30 delivers a counting signal. For example, if a 3.7 volt rectified signal appears at the output of the detector, the electronic switches 15-2 and 15-3 will send interrogated output signals to their associated AND gates 30-2 and 30-3, but the electronic switches 15-4 and 15-5, by not having received threshold input signals of sufficient magnitude to trigger them, will not send any signals to their associated AND gates 30-4 and 30-5. Since an AND gate must receive a signal at all of its input terminals in order to release an output counting signal, the AND gates 30-4 and 30-5 will not release counting signals in the above example. AND gate 30-2 likewise will not release a counting signal because the electronic switch 15-3 delivers an interrogated output signal to its associated inverter 20-3 which, when operated, functions as a gate inhibiting device by not delivering an enabling signal to the associated AND gate 30-2.

Conversely, however, AND gate 30-3 does release a counting signal because the electronic switch 15-4, by not producing an interrogated output signal, results in the inverter 20-4 associated therewith supplying an enabling signal to the AND gate 30-3. Therefore, when the AND gate 30-3 also receives a trigger signal on the trigger conductor 39, it thus simultaneously receives a signal at all three of its input terminals and consequently issues a counting signal in response thereto. Since the AND gate 30-5 represents the highest possible signal magnitude, it needs signals at only two input terminals to issue a counting signal.

From the foregoing, it is seen that each electronic switch 15, together with its associated inverter 20 and AND gate 30, functions as a sensing circuit, responsive to a peculiar input signal magnitude range, for producing a counting signal upon receipt of an input signal to the detector 10 which falls within the responsive magnitude range. It is also seen that an interrogated output signal from a given electronic switch 15, which is associated with a given signal magnitude range, effectively suppresses (through an associated inverter 20) a counting signal otherwise released from the AND gate associated with the next lower signal magnitude range.

The counting signals released by the AND gates 30 are sent to a plurality of conventional associated binary counters 40, each of which counts the number of input signals received and recognized by its associated electronic switch 15 and AND gate 30. Therefore, in the case of the 3.7 volt signal mentioned above, the counting signal issued by the AND gate 30-3 is delivered to its associated binary counter 40-3, which increases its count by "one" in a well known manner.

As successive input signals are received from the switching system, they are successively counted in the appropriate binary counter 40, which one depending on the magnitude of each input signal. At the completion of a specified period time, the cumulative count stored in each binary counter 40 is read out in the form of a digital output signal (in response to either manual control or timing pulses), and delivered to an associated digital-to-analog converter 50 which generates a DC voltage proportional to the number of counting signals previously recorded. The analog signals produced by the digital-to-analog converters 50 are then delivered to a plurality of proportioning resistors 60, each of which supplies a current to an output bus 62.

The resistance values of the proportioning resistors 60 are so adjusted that if each one received an analog signal of equal magnitude from the associated digital-to-analog converter 50 (in response to a single input signal being received within each magnitude range), the current passing through each proportioning resistor 60 would be proportional to a normalized value of signal magnitude representative of a single input signal received and counted within each particular range. For example, if one signal magnitude range was chosen to be between 2 volts and 2.99 volts, then the value of resistance of the proportioning resistor 60 associated with that range could be chosen to produce a current in bus 62 that would actually represent a normalized midrange magnitude of 2.5 volts for every input signal received within that range. Thus, while four successive input signals could, for example, have magnitudes of 2.1, 2.7, 2.3 and 2.8 volts, the output of the digital-to-analog converter and proportioning resistor combination associated with that range would produce a normalized output current equivalent to a cumulative, normalized voltage of 2.5 ×4 =10 volts rather than an actual numerical summation of 2.1 +2.7 +2.3 +2.8 =9.9 volts.

It, of course, should be obvious that not only can any other normalized signal magnitude between 2.0 and 2.99 volts be chosen to represent all signals received within the range in question, but the range itself can be defined within much narrower limits should this be required for a particular application.

From the foregoing, it can be seen that the amount of current flowing through each proportioning resistor 60 is proportional to the product of the number of input signals received from the switching system, within a predetermined period of time, that were sensed as having magnitudes within the associated magnitude range, multiplied by the normalized signal magnitude chosen to represent all of such input signals. Consequently, the output current flowing in bus 62 is representative of the numerical sum of the magnitudes, normalized and weighted within each range, of all of the input signals received by the system within a predetermined period of time.

The bus 62 is connected to an amplifier 64 which produces an output voltage signal proportional to the magnitude of the current received from bus 62. The amplifier 64, is in turn, connected to a resistive divider 66, and delivers thereto an amplified voltage signal having a magnitude that is also proportional to the numerical sum of the magnitudes, as normalized within each range, of all of the input signals received from the switching system.

The purpose of the resistive divider 66 is to divide the output voltage signal of the amplifier 64 by the total number of input signals received from the switching system, so as to obtain a representative value for the weighted mean or average magnitude of all of the received input signals. Therefore, it is required that the resistive divisor of the resistive divider 66 be increased by "one" each time that a signal is received from the switching system.

To accomplish this increasing division a conventional, signal responsive stepping switch 68 is preferably utilized in conjunction with the resistive divider, which comprises a plurality of dividing resistors 70 of identical value respectively interconnected between the successively adjacent stationary contacts of the switch, with the exception of 70-1 which is connected between the movable switch contact and ground. Stepping switch 66 is actuated in the following manner. Upon receipt of the first signal from the switching system, a trigger signal is delivered over the trigger conductor 39 to the AND gates 30 as previously mentioned. At the same time, either the same or another control signal is delivered to the stepping switch 68, as represented by the dotted line 72, and causes the stepping switch to advance one step to connect only the resistor 70-1 between the amplifier 64 and a common return or ground 74. Since only one resistor 70-1 is connected into the resistive divider 66, a representation of a single signal received by the detector 10, if allowed without delay to be rectified, interrogated, counted and then passed through the appropriate D/A converter and directed to the bus 62, would appear in amplified form at an output terminal 76 of the switch 66. In other words, the signal magnitude at terminal 76 would be representative of the normalized magnitude of the only signal received by the detector 10.

Upon receipt of the second input signal from the switching system, the control signal simultaneously appearing on the conductor 72 would advance the stepping switch 68 to a position, as shown in the drawing, at which it connects the resistors 70-1 and 70-2 in series with the output of the amplifier 64. If, at this time, the counters were read out so that the current in the output bus 62 was representative of two input test signals received by the detector 10, then the resultant signal voltage generated by the amplifier 64 would first pass through the resistor 70-2 of the stepping switch 68, and then through the resistor 70-1. Since all of the resistors 70 are of identical value, the output terminal 76 in this example would be at a voltage precisely one-half of that delivered by the amplifier 64. Stated another way, the output signal at the output terminal 76 would be representative of the normalized average of the two input signals received from the switching system; because, the output voltage of the amplifier 64 is proportional to the sum of the two normalized input voltages received— which are then divided by two in the resistive divider 66.

It is to be understood, of course, that any arbitrary number of signals received by the detector 10 may be stored in the counters 40 before being read out, converted to analog form and then a weighted average of the analog signal obtained. After each test is concluded; the binary counters 40, together with the resistive divider 66, are returned to their initial conditions to await the start of another test of the switching system, with a new sequence of tone signals delivered to the detector 10.

In summary, the present signal averaging system operates such that in response to the receipt of any number of input signals of diverse magnitudes from the input switching system within a predetermined period of time, there is produced thereafter on the output bus 62 a composite current signal which is representative of the numerical sum of the input-signal magnitudes, as normalized within each range. This current signal, in turn, produces a similarly-representative voltage signal at the output of the amplifier 64. This amplified voltage signal is then divided in the resistive divider 66 by the number of signals received in order to develop, at the output terminal 76, an amplified voltage signal which is always representative of the weighted average or mean magnitude of the total number of range-normalized magnitudes associated with the input signals initially received from the switching system.

It is to be understood that the above-described embodiment is simply illustrative of the circuitry and principles of this invention. Numerous modifications and other arrangements may be readily devised by those skilled in the art, which will embody the principles of the invention and fall within the spirit and scope thereof.

What I claim is:

1. A system for determining a representative value for the average magnitude of a plurality of input signals of diverse magnitudes received within a predetermined period of time comprising:
    a plurality of sensing means, each responsive to a different input signal magnitude range, and each producing a counting signal each time an input signal is received within the responsive magnitude range thereof;
    a plurality of counting means respectively responsive to said sensing means, each of said counting means counting the number of counting signals received from the associated one of said sensing means, and each producing an output signal representative of the total number of input counting signals counted;
    converting means responsive to the receipt of all of the output signals from said counting means for producing an output signal that is representative of the summation of the magnitudes of the input signals received by said system; and
    means for dividing the magnitude of the last-mentioned output signal by the total number of input signals received by all of said sensing means within said predetermined period of time.

2. A system according to claim 1 wherein said dividing means comprises:
    a plurality of series-connected resistors of equal resistance value; and
    means responsive to each successive input signal received by said sensing means for connecting one additional of said resistors in series with said converting means.

3. A system according to claim 1 wherein said sensing means comprises:
    a plurality of threshold-voltage-responsive interrogating means, each producing an interrogated output signal in response to each input signal received which has at least a threshold-voltage-responsive magnitude;
    a plurality of signal releasing means, each connected to a different one of said interrogating means, and at least partially conditioned in response to the receipt of an interrogated output signal, for releasing a counting signal when otherwise not inhibited; and
    a plurality of inhibiting means, each connected to a different one of said interrogating means, excluding the one associated with the lowest magnitude range, and responsive to an output signal from an associated interrogating means for inhibiting the release of a counting signal by said signal releasing means associated with an interrogating means responsive to the next lower input signal magnitude range.

4. A system according to claim 1 wherein said converting means comprises:
    a plurality of first means respectively associated with said counting means, each first means converting the output signal received from the associated counting means into an output analog signal representative in magnitude to the total number of counting signals counted by said associated counting means; and
    a plurality of second means respectively connected to the outputs of said first means for adjusting and combining all of said analog signals into a single weighted output signal representative of the total number of input signals received by said system, each of said analog signals prior to being combined being adjusted so that the actual magnitude of each input signal represented thereby is equated to a predetermined normalized signal magnitude.

5. A system according to claim 4 wherein each of said counting means comprises a binary counter, and wherein each of said first means of said converting means comprises a digital-to-analog converter.

6. An apparatus according to claim 5 wherein each of said second means connected to said first means comprises a resistor interconnected between the output of the associated digital-to-analog converter and a common bus.

7. An electrical system for determining a representative value for the average magnitude of a plurality of input signals of diverse magnitudes received within a predetermined period of time comprising:
    a plurality of threshold-voltage-responsive interrogating means, each responsive to an input signal falling within a different input signal magnitude range, and each producing an interrogated output signal whenever an input signal is received which has a magnitude within the responsive magnitude range;
    a plurality of gate means respectively connected to said interrogating means, each gate means in response to the receipt of an interrogated signal being at least partially conditioned to an enabled state, and whenever enabled, releasing a counting signal; and
    a plurality of inverter means, each connected to a different one of said interrogating means, excluding the one associated with the lowest minimum input signal magnitude range, and each of said inverter means in response to the absence of an output signal from an associated interrogating means, supplying a signal to and at least partially conditioning for the release of a counting signal the gate means associated with the interrogating means responsive to input signals received within the next lower signal magnitude range;
    means for supplying an enabling signal at least to said gate means otherwise conditioned to be enabled each time an input signal within one of said magnitude ranges is received by said system;
    a plurality of counting means respectively connected to said gate means, each counting means initially counting the number of counting signals released by the associated gate means within said predetermined period of time, and subsequently producing an output signal representative of the total count;
    a plurality of converting means respectively connected to said counting means, for combining the output signals of said counting means, and for producing an output signal that is representative of the weighted summation of range-normalized magnitudes of the input signals counted by said system; and
    means for dividing the magnitude of the last-mentioned output signal by the total number of input signals counted by said system within said predetermined period of time.

8. A system in accordance with claim 7 wherein each of said converting means for producing an output summation signal comprises:
- a digital-to-analog converter for converting the output signal received in digital form from an associated counting means into an analog signal representative of the total count registered in said registered in said associated counting means; and
- means for adjusting and combining the analog signals from all of said digital-to-analog converters so as to produce a weighted output signal representative of the magnitudes of all of the input signals received by said system within said predetermined period of time, the magnitude of each of said analog signals prior to being combined being adjusted so that the actual magnitude of each input signal received within a given magnitude range and represented by a given analog signal is equated to a predetermined normalized signal magnitude.

9. An electrical system in accordance with claim 8, wherein said means for combining the analog signals comprises a plurality of resistors each interconnected between the output of the respectively associated digital-to-analog converter and a common bus, and
- wherein said means for dividing the magnitude of the output summation signal comprises a plurality of series-connected resistors of equal resistance value, and
- movable switch means for connecting successive ones of said resistors in series with said common bus in response to successive input signals being received by said interrogating means.